(12) United States Patent
Liao

(10) Patent No.: US 6,478,060 B1
(45) Date of Patent: Nov. 12, 2002

(54) WOOD PLANING MACHINE WITH A WORKPIECE-GUIDING PLATE

(76) Inventor: Juei-Seng Liao, No. 295, Sec. 1, Nanking E. Rd., Taichung City (TW)

(*) Notice: Subject to any disclaimer, the term of this patent is extended or adjusted under 35 U.S.C. 154(b) by 0 days.

(21) Appl. No.: 10/061,335

(22) Filed: Feb. 4, 2002

(30) Foreign Application Priority Data

Dec. 4, 2001 (TW) .................................. 90221093 U

(51) Int. Cl.⁷ .............................. B27C 1/14; B27C 1/12
(52) U.S. Cl. .................................. 144/253.8; 144/253.5
(58) Field of Search ...................... 83/467.7; 144/114.1, 144/117, 129, 253.1, 253.5, 253.8

(56) References Cited

U.S. PATENT DOCUMENTS 5,533,557 A * 7/1996 Jedlicka et al. .......... 144/253.8
6,026,870 A * 2/2000 Liu ........................ 144/253.5 X
6,250,349 B1 * 6/2001 Crofutt .................... 144/253.5

* cited by examiner

Primary Examiner—W. Donald Bray
(74) Attorney, Agent, or Firm—Oblon, Spivak, McClelland, Maier & Neustadt, P.C.

(57) ABSTRACT

A wood planing machine includes a workpiece-guiding plate disposed on a machine bed, a base disposed fixedly on the bed, and a seat disposed movably on the base. Two fixing blocks are disposed fixedly on two opposite sides of the seat. Two coupling blocks are disposed fixedly on the plate. Two links are connected pivotally to the fixing blocks and the coupling blocks so as to permit rotation of the coupling blocks relative to the fixing blocks such that the angle of the plate can be adjusted with respect to the bed. A control rod assembly extends through the first and second links, and is rotatable to move the first and second links toward each other so as to clamp the fixing blocks and the coupling blocks, thereby locking the plate on the bed.

10 Claims, 14 Drawing Sheets

WOOD PLANING MACHINE WITH A WORKPIECE-GUIDING PLATE

CROSS REFERENCE TO RELATED APPLICATION

This application claims priority of Taiwanese Application No. 90221093, filed on Dec. 4, 2001.

BACKGROUND OF THE INVENTION

1. Field of the Invention

This invention relates to a wood planing machine, and more particularly to a wood planing machine, which includes an angle-adjusting device that can adjust the angle of a workpiece-guiding plate with respect to a machine bed.

2. Description of the Related Art

Referring to FIGS. 1, 2, 3, and 4, a conventional wood planing machine 10 is shown to include a machine frame 11, a support member 12, an elongated cutter 13, a machine bed consisting of a right half 14 and a left half 15, and a workpiece-guiding plate 16. The support member 12 is disposed on a top surface of the machine frame 11. The cutter 13 is journalled on the support member 12 between the right and left halves 14, 15, and is rotatable by a driving source (not shown). The plate 16 is disposed on the right and left halves 14, 15 of the machine bed. A workpiece (not shown), which abuts against the plate 16, can be pushed along the latter on the machine bed from the right half 14 to the left half 15, and vice versa, so as to be cut by the cutter 13. An angle-adjusting device 20 is disposed to adjust the angle of the plate 16 with respect to the machine bed, and includes a fixed base 21, a movable seat 22, a rotatable member 23, a bearing member 24, a first control unit 25, a second control unit 26, and a guiding rail 27 that is bolted onto a horizontal top wall of the base 21 and that extends in a transverse direction of the machine bed. The base 21 is bolted onto a rear side wall 151 of the left half 15. The seat 22 has a bottom surface, which is formed with a slide slot 2221 that engages the guiding rail 27 so as to permit movement of the seat 22 on the base 21 in the transverse direction of the machine bed. The rotatable member 23 is bolted onto a rear surface of the plate 16. The bearing member 24 is unitary, and has a vertical rib 241 that is received slidably within an open-ended vertical slot 2211 in a vertical wall 221 of the seat 22, and a curved concave portion 242 that engages fittingly a curved convex portion 231 of the rotatable member 23. The second control unit 26 includes a locking element 261, a guide rod 262 that is journalled within a hole 2222 in a horizontal plate 222 of the seat 22, a nut 263, and a rotary lever 264 that is connected fixedly to the guide rod 262. The guide rod 262 extends through a vertical slot 2212 in the vertical wall 221 of the seat 22, a hole 243 in the bearing member 24, and a slide slot 232 in the convex portion 231 of the rotatable member 23, and has a threaded end that engages a threaded hole (not shown) in the locking element 261. The locking element 261 has a portion that is received movably within the slide slot 232 so as to prevent rotation of the locking element 261 on the guide rod 262. As such, the rotatable member 23 and the bearing member 24 are retained on the guide rod 262, and are confined between the locking element 261 and the nut 263. The rotary lever 264 is rotatable to move the locking element 261 on the guide rod 262 between a locking position, where the locking element 261 presses the rotatable member 23 and the bearing member 24 against the nut 263 so as to lock the rotatable member 23 on the bearing member 24, and a release position, where the rotatable member 23 and the bearing member 24 are unlocked from the locking element 261 so that the rotatable member 23 can rotate relative to the bearing member 24 for angle adjustment of the plate 16. The first control unit 25 includes a rotating shaft 251 with an eccentric pin 2511, a vertical bolt 252, a nut 253, and a rotary lever 254. The rotating shaft 251 is journalled within the seat 22. The eccentric pin 2511 extends into a hole 2521 in a head of the bolt 252 so as to move the bolt 252 vertically relative to the base 21. The bolt 252 extends through a guide slot 212 in a horizontal top wall 211 of the base 21, which extends in the transverse direction of the machine bed. The nut 253 is disposed under the top wall 211 of the base 21, and engages the bolt 252. The rotary lever 254 is connected fixedly to the rotating shaft 251, and is rotatable to move the bolt 252 between a locking position shown in Fig. 4, where the nut 253 presses against the top wall 211 so as to lock the seat 22 on the base 21, and a release position, where the nut 253 is spaced apart from the top wall 211 so as to release the seat 22 from the base 21, thereby permitting position adjustment of the plate 16.

The aforesaid conventional wood planing machine 10 suffers from the following disadvantages:

(1) Because the clamping force of the locking element 261 and the nut 263 acting on the rotatable member 23 and the bearing member 24 is relatively small, the plate 16 cannot be fixed effectively on the machine bed during operation.

(2) Because the plate 16 is supported directly by only one element, i.e. the rotatable member 23, the former sways easily about the latter during operation.

(3) To adjust accurately the angle of the plate 16 with respect to the machine bed, there is a need for a relatively high manufacturing precision of the convex portion 231 of the rotatable member 23 and the concave portion 241 of the bearing member 24.

(4) The seat 22 is guided to move on the base 21 in the transverse direction of the machine bed by engagement of the guiding rail 27 and the slide slot 2221 in the seat 22, thereby hindering smooth movement of the seat 22 and the plate 16.

SUMMARY OF THE INVENTION

An object of this invention is to provide a wood planing machine, which includes a workpiece-guiding plate that can be fixed effectively relative to a machine bed during operation.

Another object of this invention is to provide a wood planing machine, which does not require a high manufacturing precision of a device for supporting rotatably a workpiece-guiding plate.

Still another object of this invention is to provide a wood planing machine, which includes a movable seat that can move smoothly on a fixed base.

According to this invention, a wood planing machine includes a workpiece-guiding plate disposed on a machine bed, a base disposed fixedly on the bed, and a seat disposed movably on the base. Two fixing blocks are disposed fixedly on two opposite sides of the seat. Two coupling blocks are disposed fixedly on the plate. Two links are connected pivotally to the fixing blocks and the coupling blocks so as to permit rotation of the coupling blocks relative to the fixing blocks such that the angle of the plate can be adjusted with respect to the bed. A control rod assembly extends through the first and second links, and is rotatable to move the first and second links toward each other so as to clamp the fixing blocks and the coupling blocks, thereby locking the plate on the bed. Because the plate is connected to the seat by the links, which are disposed on the two sides of the seat, the plate can be fixed effectively relative to the seat. Furthermore, the plate can be prevented by the links from swaying about the seat during operation. In addition, there is no need for a high manufacturing precision for the links, the fixing blocks, and the coupling blocks.

Preferably, the seat is generally inverted U-shaped, and has a horizontal top wall and a pair of first and second side walls that extend integrally and downwardly from two opposite sides of the top wall and that define a dovetail groove therebetween under the top wall. The base has a fixed dovetail rib that is inserted into the dovetail groove and that presses against the first side wall, and a movable dovetail member that is inserted into the dovetail groove and that is movable between a locking position, where the dovetail member presses against the second side wall so as to lock the seat on the base, and a release position, where the dovetail member is spaced apart from the second side wall so as to permit movement of the seat relative to the base. Accordingly, the seat can be locked firmly on the base. Furthermore, because the dovetail rib and the dovetail member are disposed within two opposite sides of the dovetail groove, the seat can be guided to move smoothly on the base.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
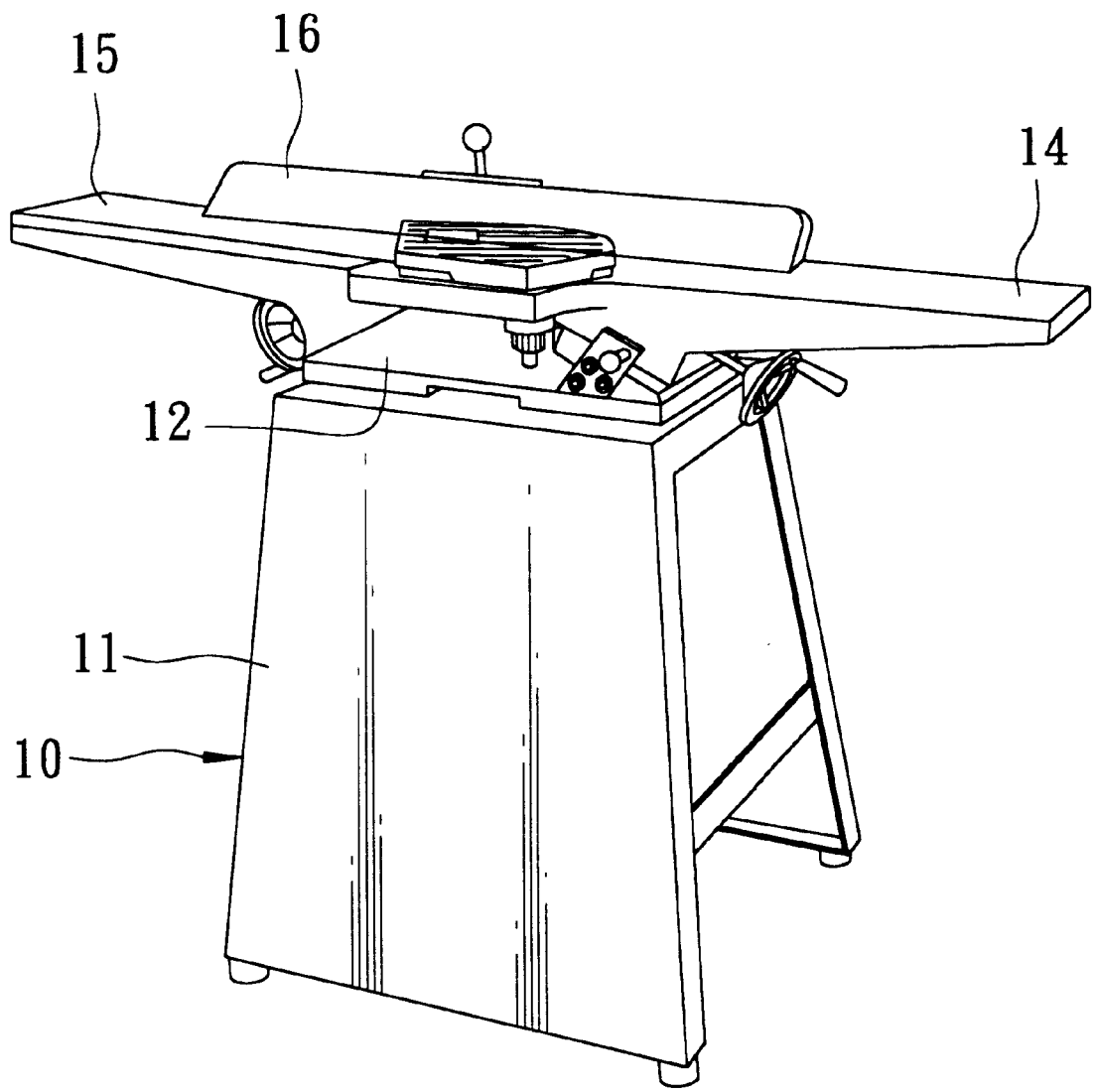
FIG. 1 is an assembled perspective view of a conventional wood planing machine.
Figure 2:
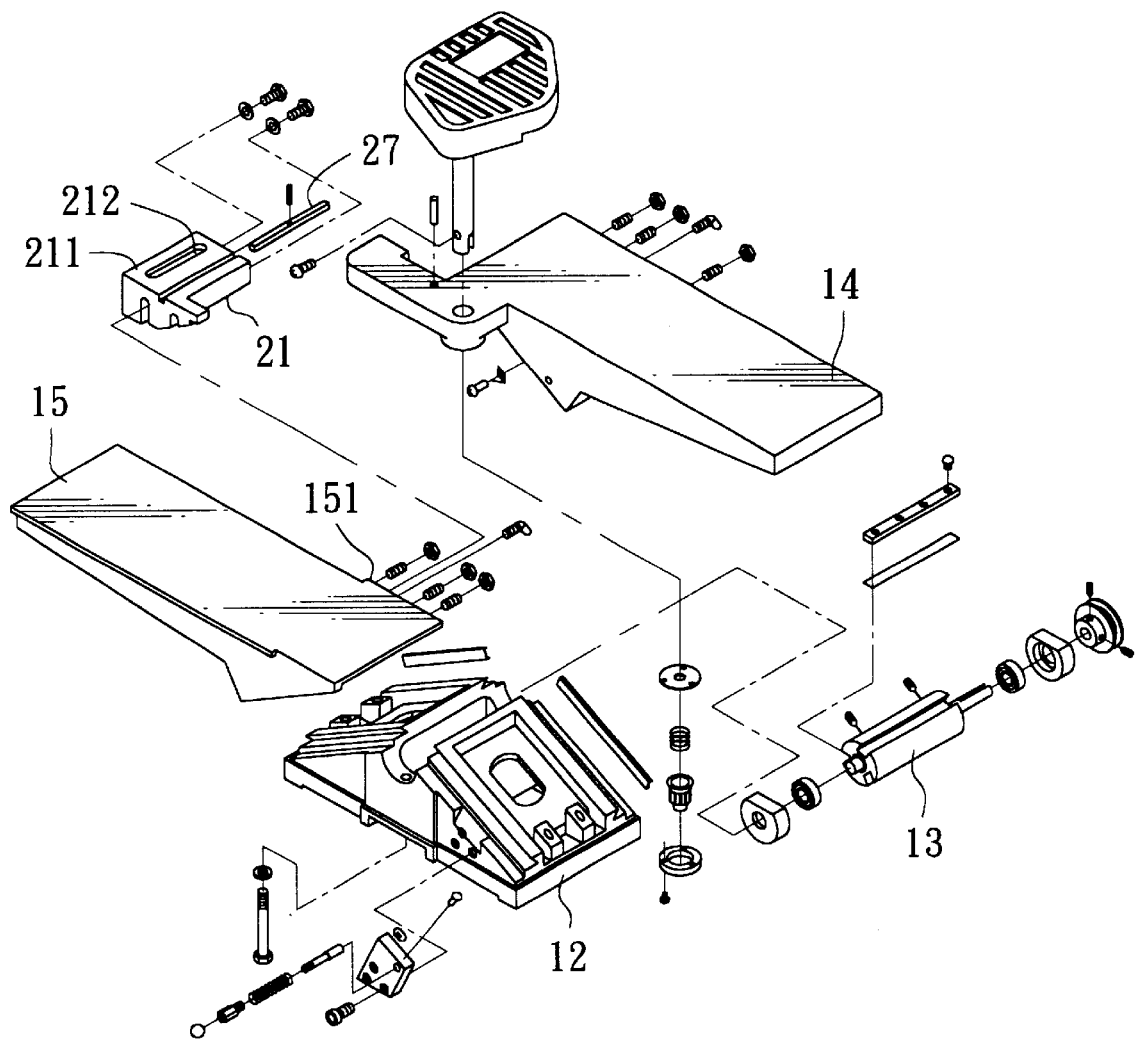
FIG. 2 is a fragmentary exploded perspective view of the conventional wood planing machine, illustrating how a cutter is disposed on a support member.
Figure 3:
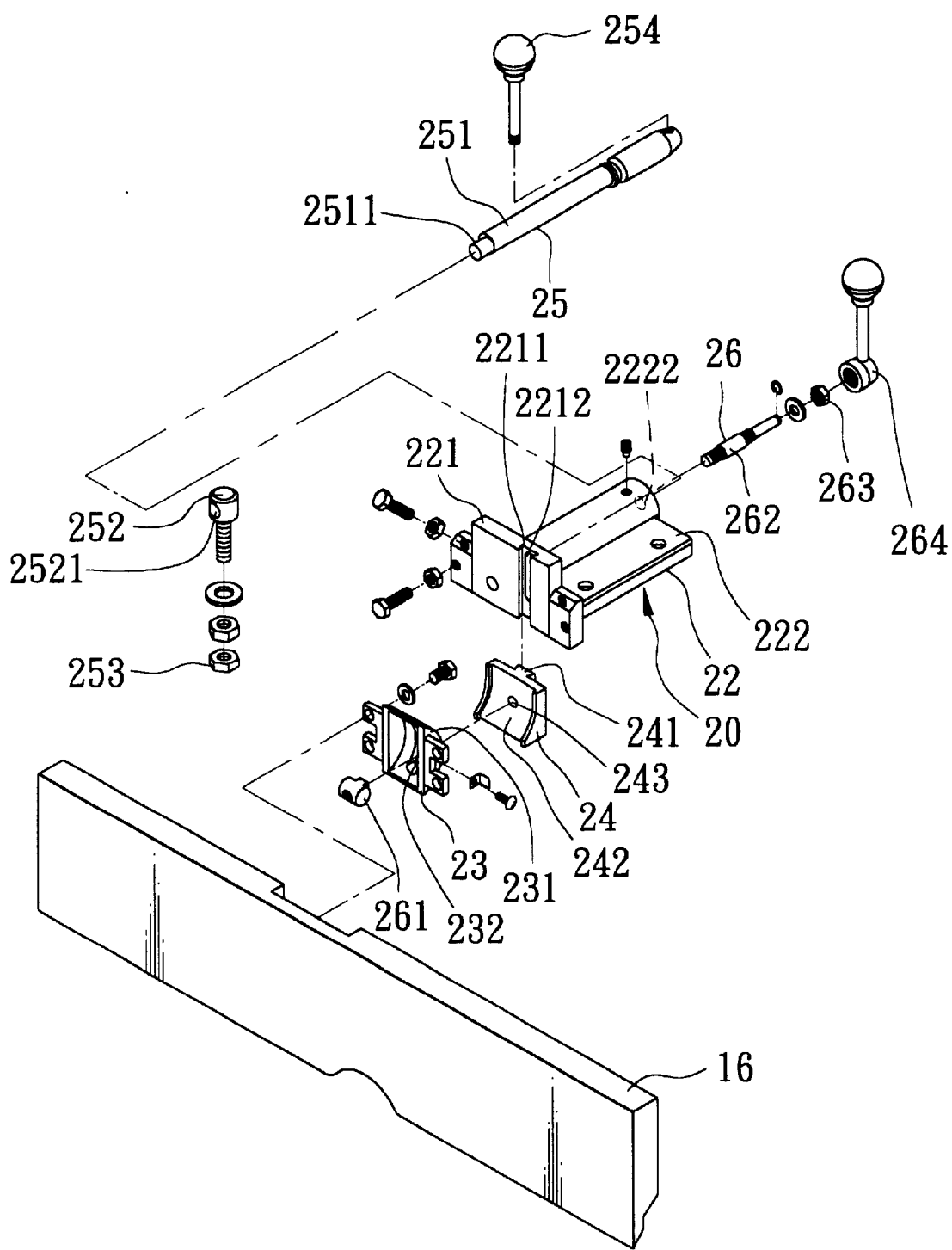
FIG. 3 is another fragmentary exploded perspective view of the conventional wood planing machine, illustrating how a workpiece-guiding plate is mounted on a movable seat.
Figure 4:
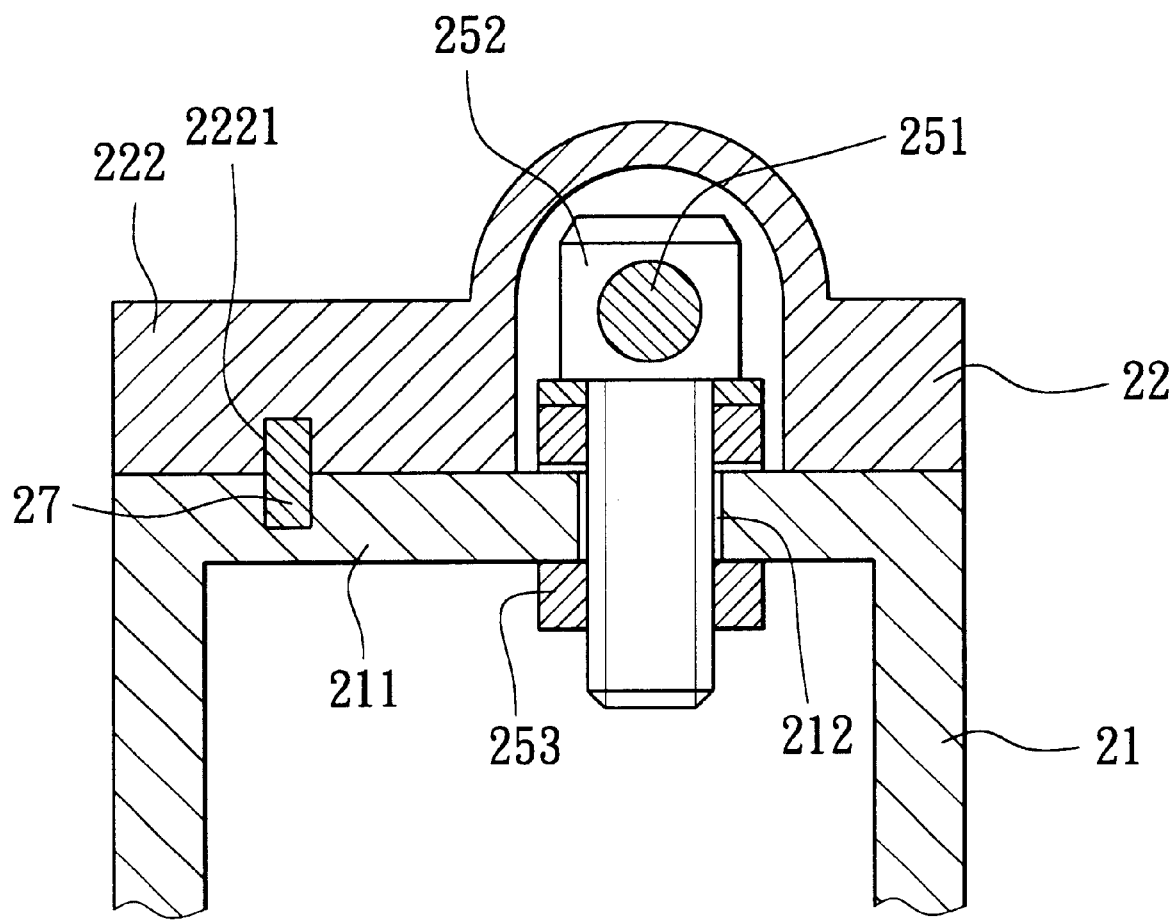
FIG. 4 is a fragmentary sectional view of the conventional wood planing machine, illustrating how the seat is locked on a base.
Figure 5:
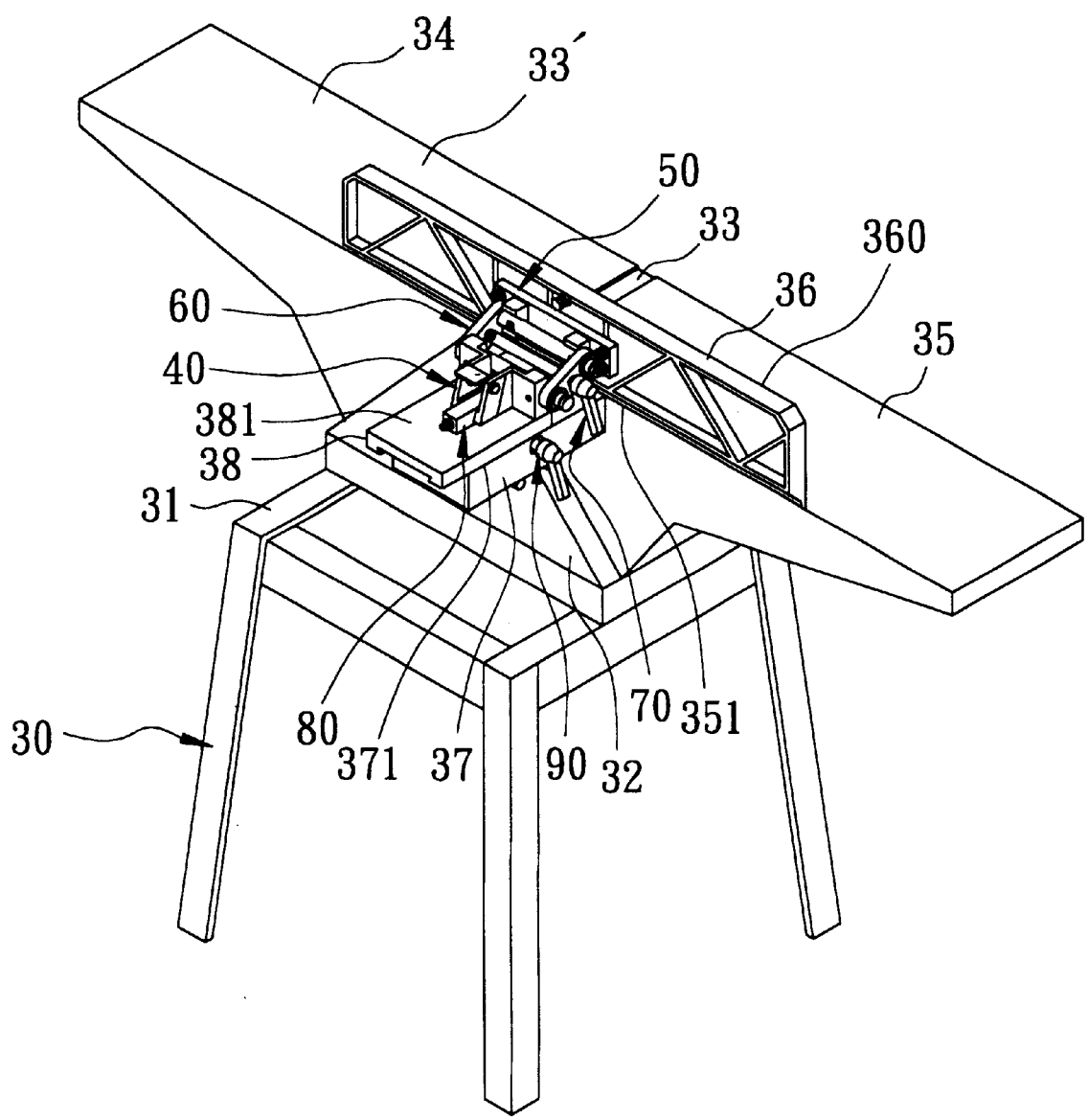
FIG. 5 is an assembled perspective view of the preferred embodiment of a wood planing machine according to this invention.

Referring to FIG. 5, the preferred embodiment of a wood planing machine 30 of this invention is shown to include a machine frame 31, a support member 32, an elongated cutter 33, a machine bed that consists of a left half 34 and a right half 35, a workpiece-guiding plate 36, a fixed base 37, and a movable seat 38. The support member 32 is disposed on the frame 31. A workpiece-supporting surface 33' is defined on the left and right halves 34, 35 in front of the plate 36. The cutter 33 is journalled on the support member 32 between the left and right halves 34, 35 and in front of the plate 16 in a known manner, and projects upward from the workpiece-supporting surface 33'. A workpiece (not shown) can be pushed to move on the workpiece-supporting surface 33' in a workpiece-feeding direction that is parallel to the length of the machine bed. The workpiece (not shown) has a flat first surface that can slide on a flat front surface 360 of the plate 36 during operation. The base 37 is disposed fixedly on a rear wall 351 of the right half 35 of the bed. The seat 38 is disposed movably on the base 37, and is movable on the base 37 in a seat-moving direction transverse to the workpiece-feeding direction.

An angle-adjusting device for adjusting the angle of the plate 36 relative to the bed is connected to a rear side 361 of the plate 36, and includes a fixing unit 40, a coupling unit 50, a driving unit 60, a control rod assembly 70, a plate-supporting unit 80, and a seat-locking unit 90.

Figure 6:
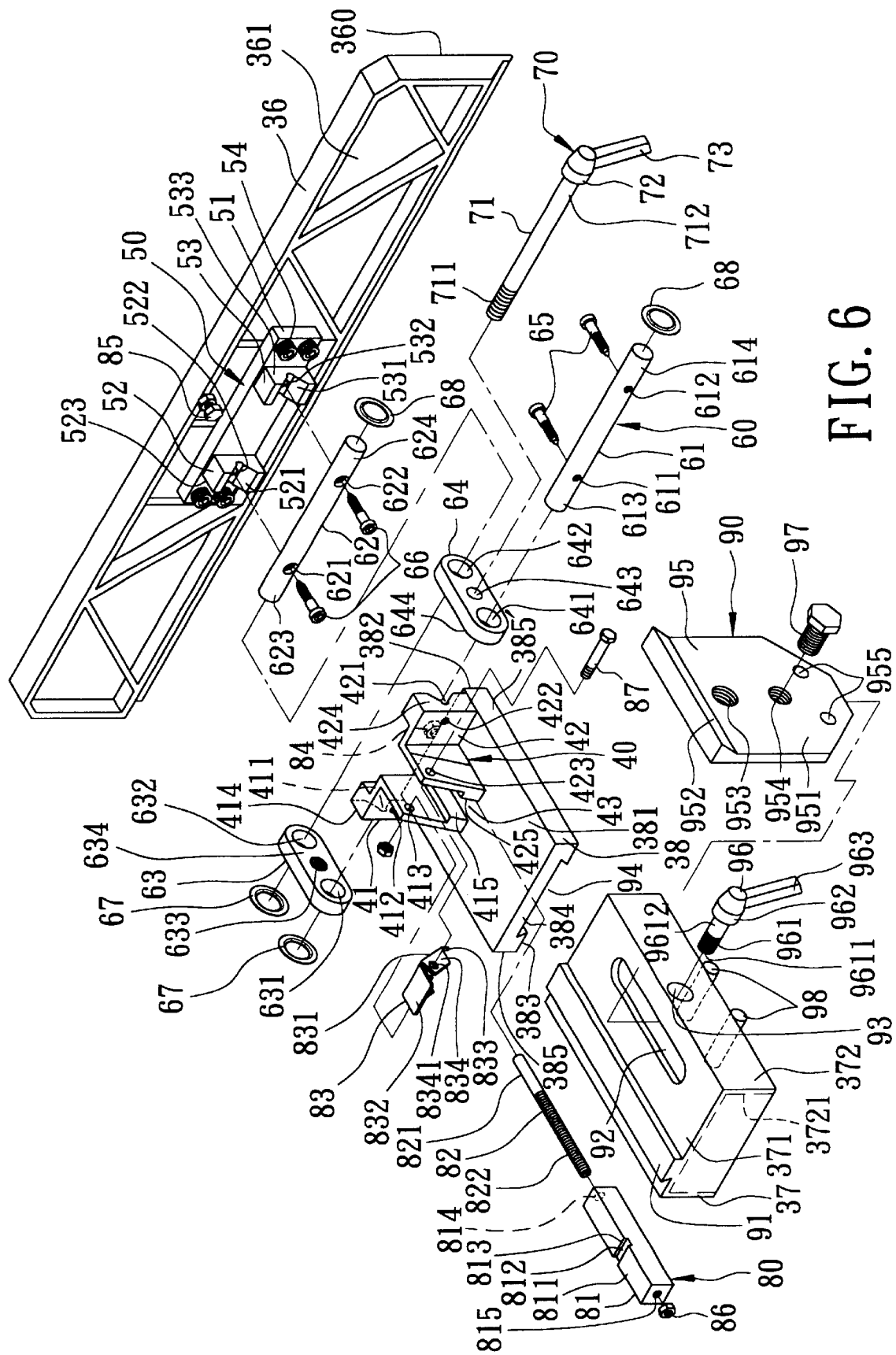
FIG. 6 is a fragmentary exploded perspective view of the preferred embodiment.

Referring to FIG. 6, the fixing unit 40 includes a pair of first and second fixing blocks 41, 42 that are disposed respectively and fixedly on two opposite sides of a top surface 381 of the seat 38. Each of the first and second fixing blocks 41, 42 has a front surface that is formed with a generally triangular-cross-sectioned groove 411, 421, a threaded hole 412, 422, a pivot hole 413, 423, and a flat outer side surface 414, 424.

The coupling unit 50 includes a mounting strip 51 that is connected fixedly to the rear side 361 of the plate 36 by four bolts 54, and a pair of first and second coupling blocks 52, 53 that are mounted fixedly on the strip 51 and that are aligned respectively with the first and second fixing blocks 41, 42 along the seat-moving direction. Each of the first and second coupling blocks 52, 53 has a rear surface that is formed with a generally triangular-cross-sectioned groove 521, 531, a threaded hole 522, 532, and a flat outer side surface 523, 533.

The driving unit 60 includes a fixed shaft 61, a rotatable shaft 62, a first link 63, and a second link 64. Each of the fixed shaft 61 and the rotatable shaft 62 has a circular cross-section. The fixed shaft 61 has two radial holes 611, 612 that are formed therethrough. A pair of bolts 65 extend respectively through the radial holes 611, 612 in the fixed shaft 61 to engage the threaded holes 412, 422 in the first and second fixing blocks 41, 42 so as to connect respectively and fixedly first and second end portions 613, 614 of the fixed shaft 61 to the first and second fixing blocks 41, 42. The first and second end portions 613, 614 of the fixed shaft 61 extend respectively through rear holes 631, 641 in the first and second links 63, 64. The rotatable shaft 62 has two radial holes 621, 622 that are formed therethrough. A pair of bolts 66 extend respectively through the radial holes 621, 722 in the rotatable shaft 62 so as to connect respectively and fixedly first and second end portions 623, 624 of the rotatable shaft 62 to the first and second coupling blocks 52, 53. The first and second end portions 623, 624 of the rotatable shaft 62 extend respectively through front holes 632, 642 in the first and second links 63, 64. Two first retaining rings 67 are sleeved fixedly on the first end portions 613, 623 of the fixed shaft 61 and the rotatable shaft 62 so as to prevent removal of the first link 63 from the fixed shaft 61 and the rotatable shaft 62. Two second retaining rings 68 are sleeved fixedly on the second end portions 614, 624 of the fixed shaft 61 and the rotatable shaft 62 so as to prevent removal of the second link 64 from the fixed shaft 61 and the rotatable shaft 62. As such, the first and second links 63, 64 are connected rotatably to the plate 36 and the seat 38 so as to permit rotation of the plate 36 relative to the seat 38. The first link 63 has a threaded hole 633 that is formed therethrough, and a flat inner side surface 634. The second link 64 has a middle hole 643 that is formed therethrough, and a flat inner side surface 644.

Figure 7:
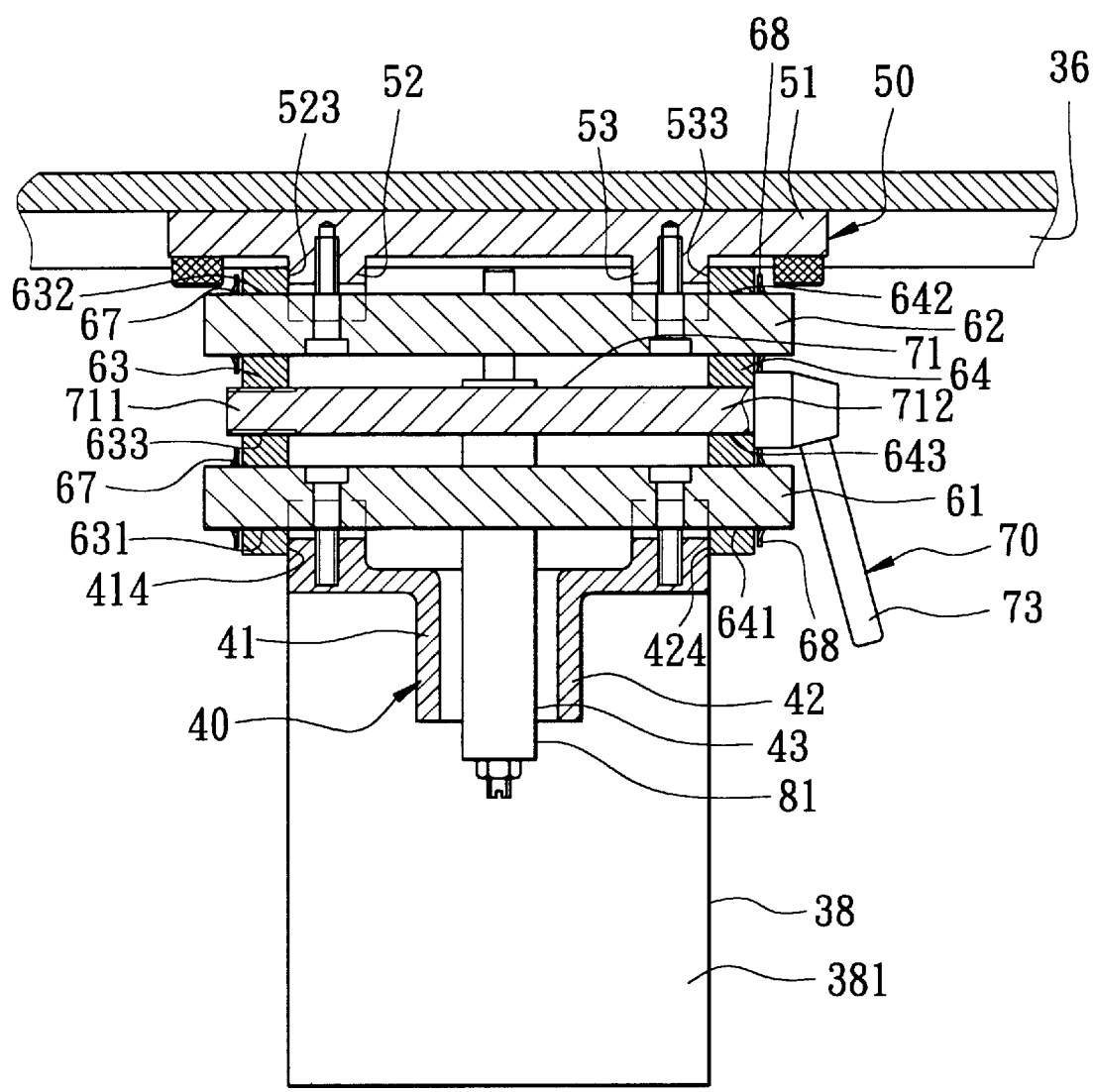
FIG. 7 is a fragmentary sectional view of the preferred embodiment, illustrating how a workpiece-guiding plate is locked on a movable seat.
Figure 8:
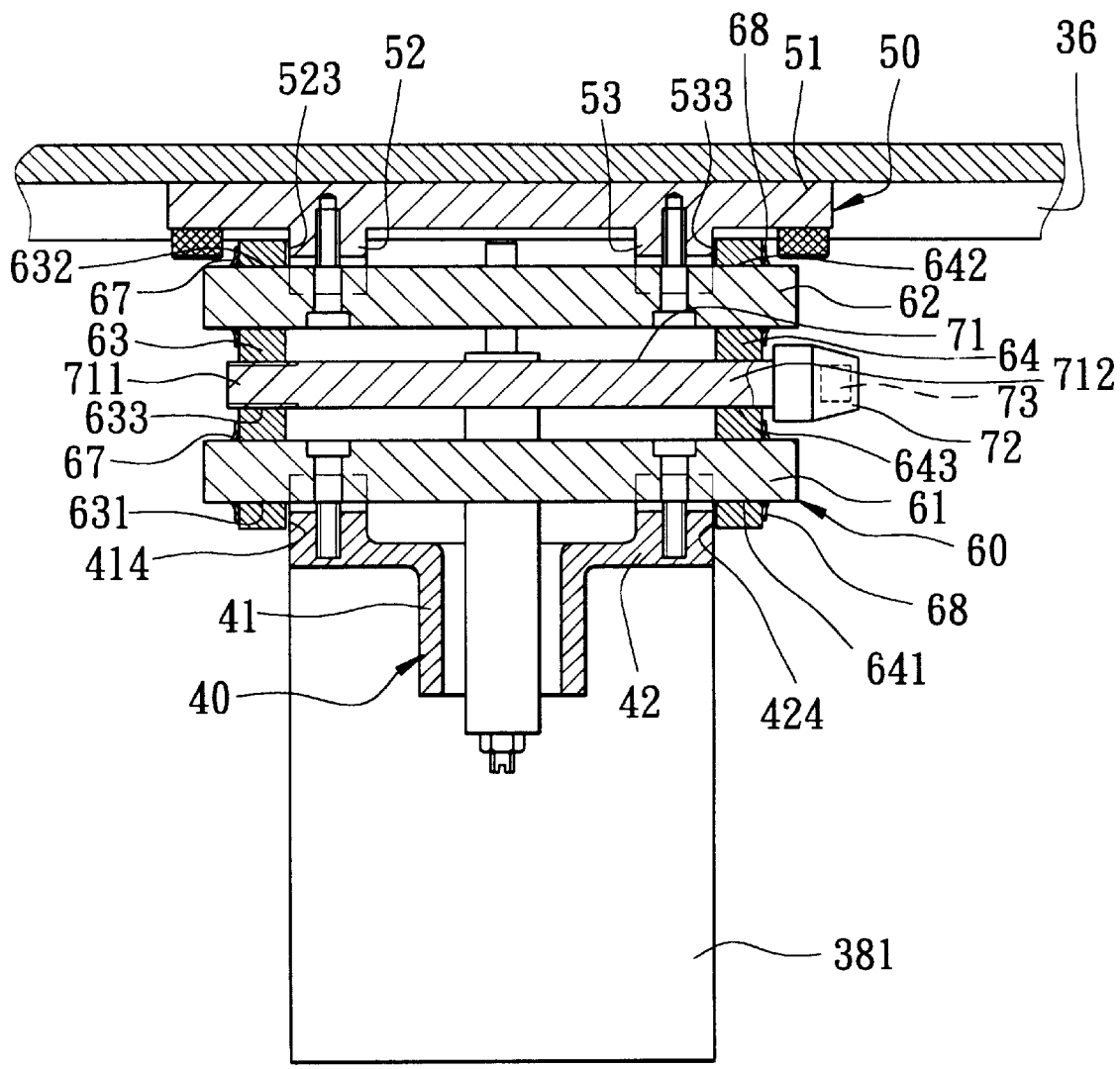
FIG. 8 is a fragmentary sectional view of the preferred embodiment, illustrating how the plate is unlocked from the movable seat, thereby permitting angle adjustment of the plate.

The control rod assembly 70 includes a rod body 71, an outward flange 72, and a radially and outwardly extending rotary lever 73. The rod body 71 has a threaded first end 711 that engages the threaded hole 633 in the first link 63, and a non-threaded second end 712 that extends through the middle hole 643 in the second link 64, as shown in FIG. 7. The inner side surface 634 of the first link 63 presses against the outer side surfaces 414, 523 of the first fixing block 41 and the first coupling block 52. The outward flange 72 extends integrally, radially and outwardly from the second end 712 of the rod body 71, and abuts against the second link 64 so as to press the inner side surface 644 of the second link 64 against the outer side surfaces 424, 533 of the second fixing block 42 and the second coupling block 53. As such, the first and second fixing blocks 41, 42 and the first and second coupling blocks 52, 53 are clamped between the first and second links 63, 64, thereby locking the plate 36 relative to the seat 38. The rotary lever 73 is formed integrally with the outward flange 72, and is rotatable in a first direction so as to move the first link 63 away from the outward flange 72 to a position shown in FIG. 8, where the first and second fixing blocks 41, 42 and the first and second coupling blocks 52, 53 are released from the first and second links 63, 54 so as to permit rotation of the first and second coupling blocks 52, 63 about the fixed shaft 61 for angle adjustment of the plate 36 with respect to the machine bed. The rotary lever 73 is rotatable in an opposite second direction when angle adjustment of the plate 36 is completed, so as to move the first link 63 on the first end 711 of the rod body 71 to the position shown in FIG. 7, thereby locking the plate 36 relative to the seat 38.

Figure 9:
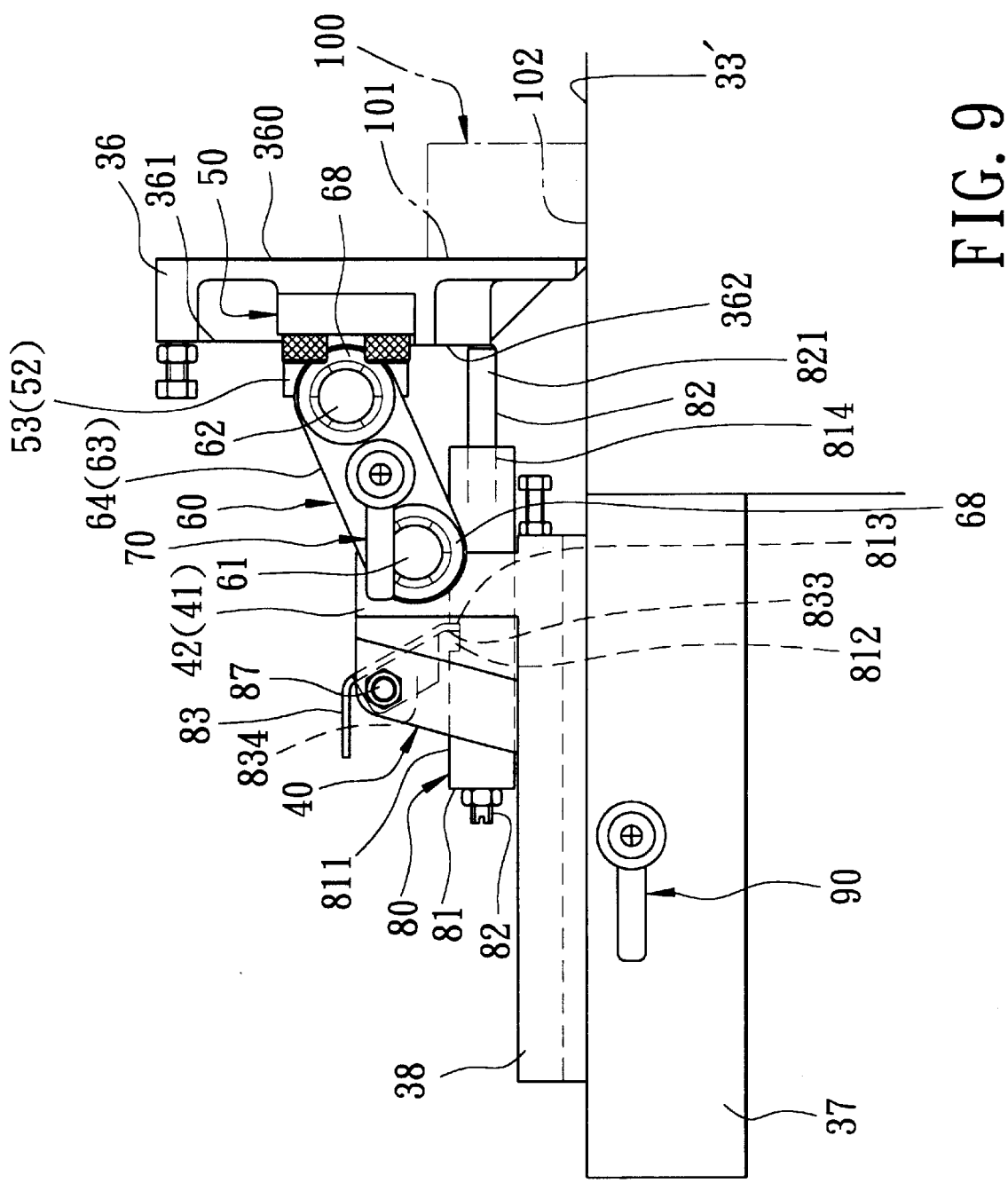
FIG. 9 is a schematic fragmentary side view of the preferred embodiment when a front surface of the plate is retained at a vertical position.

Referring to FIGS. 6 and 9, the first and second fixing blocks 41, 42 have two vertical guide surfaces 415, 425 that define a guideway 34 therebetween on the top surface 381 of the seat 38. The plate 36 has a first engagement surface 362 at a lower end portion of the rear side 361, which is parallel to the front surface 360. A flat first surface 101 of a first workpiece 100 is disposed to abut against the front surface 360 of the plate 36 for cutting.

The plate-supporting unit 80 includes a positioning rod 81, a first supporting element 82, a retaining crank 83, a second supporting element 84, a third supporting element 85, a nut 86, and a pivot pin 87. The positioning rod 81 is received slidably within the guideway 43 between the first and second fixing blocks 41, 42. Two opposite sides of the positioning rod 81 abut respectively against the guide surfaces 415, 425 of the first and second fixing blocks 41, 42 so that the positioning rod 81 can move in the seat-moving direction. The positioning rod 81 includes a top surface 811 that is formed with a positioning groove 812 defined by a front side wall 813, and a central hole 814 that is formed axially through the positioning rod 81 and that has a threaded rear end 815. The first supporting element 82 is shaped as a horizontal rod, which extends through the central hole 814 in the positioning rod 81, and which has an non-threaded front end 821 that projects forward from the front end of the positioning rod 81 and that is capable of abutting against the first engagement surface 362 of the plate 36 so as to locate the front surface 360 of the plate 36 at a vertical position shown in FIG. 9 for performing a finishing operation on a second surface 102 of the first workpiece 100, which is generally perpendicular to the first surface 101, and a threaded rear end 822 that engages threadably the threaded rear end 815 of the central hole 814 in the positioning rod 81 and that projects rearward from the rear end of the positioning rod 81 to engage the nut 86, thereby locking the first supporting element 82 on the positioning rod 81. The retaining crank 83 is mounted rotatably between the first and second fixing blocks 41, 42 by the pivot pin 87, and has a crank body 831, an upper crank arm 832, a lower crank arm 833, and two lugs 834 that are formed with two aligned pivot holes 8341. The pivot pin 87 extends through the pivot holes 413, 423 in the first and second fixing blocks 41, 42 and the pivot holes 8341 in the crank 83. The lower crank arm 833 is inserted into the positioning groove 812 in the top surface 811 of the positioning rod 81 and abuts against the front side wall 813 of the positioning rod 81 so as to prevent rearward movement of the positioning rod 81 on the seat 38, thereby positioning the first supporting element 82 relative to the seat 38.

Figure 10:
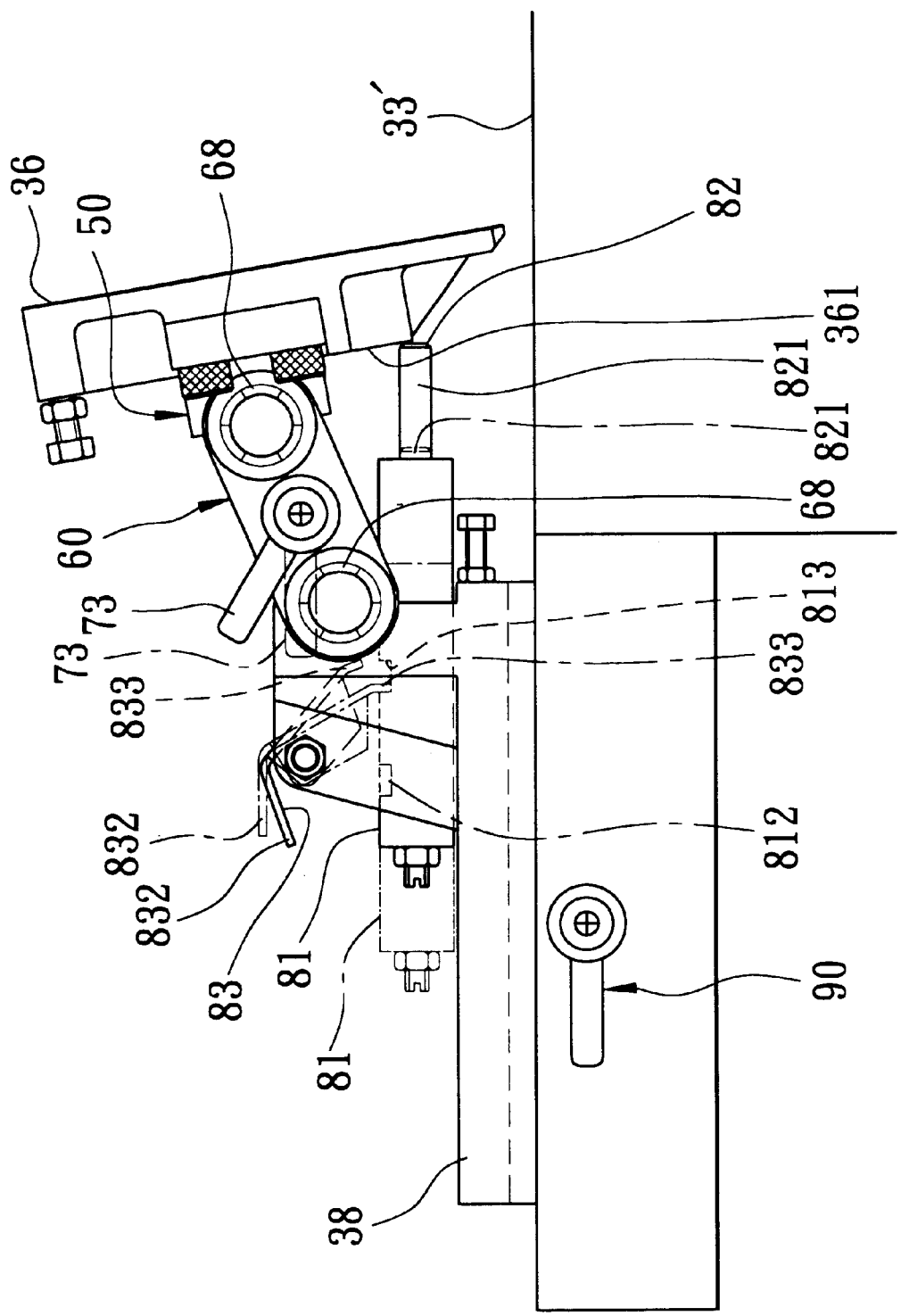
FIG. 10 is a schematic fragmentary side view of the preferred embodiment, illustrating how a retaining crank is removed from a positioning groove of a positioning rod in order to remove the front surface of the plate from the vertical position.

Referring to FIG. 10, the positioning member 81 can be pushed forward on the seat 38 so as to turn the lower crank arm 833 rearward within the positioning groove 812 such that the upper crank arm 832 can be rotated relative to the seat 38 to remove the lower crank arm 833 from the positioning groove 812, thereby permitting position adjustment of the first supporting element 82 relative to the seat 38.

Figure 11:
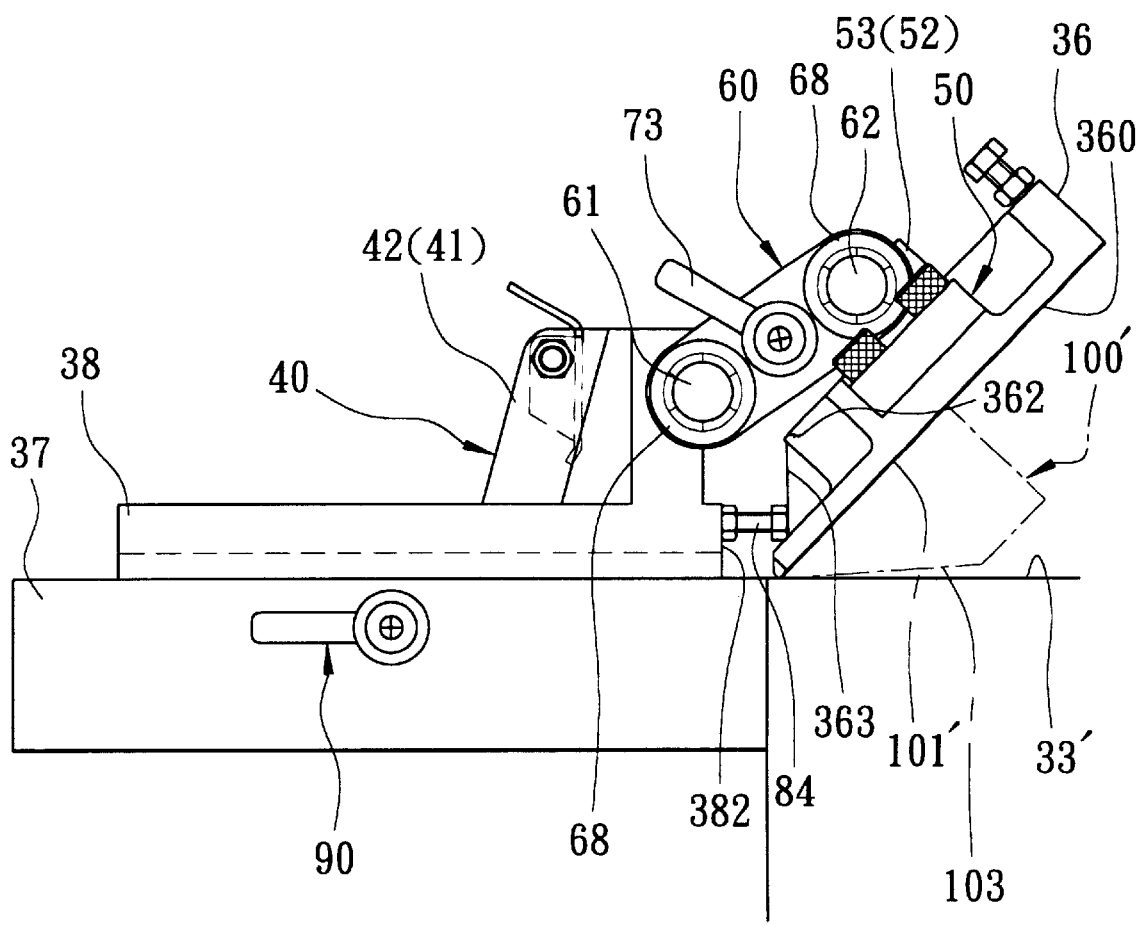
FIG. 11 is a schematic fragmentary side view of the preferred embodiment when the front surface of the plate is disposed at a forwardly inclined position.

Referring to FIGS. 6 and 11, the lower end portion of the plate 36 further has a second engagement surface 363 that forms an obtuse angle with the first engagement surface 362. The second supporting element 84 is shaped as a headed bolt, and engages the threaded hole in a vertical front surface 382 of the seat 38. The second supporting element 84 has a front end head portion that is capable of abutting against the second engagement surface 363 of the plate 36 so as to form an acute angle between the front surface 360 of the plate 36 and the workpiece-supporting surface 33' of the bed. As such, a flat first surface 101' of a second workpiece 100' can be disposed to abut against the front surface 360 of the plate 36 so as to perform a finishing operation on a second surface 103 of the second workpiece 100', which forms an acute angle with respect to the first surface 101'.

Figure 12:
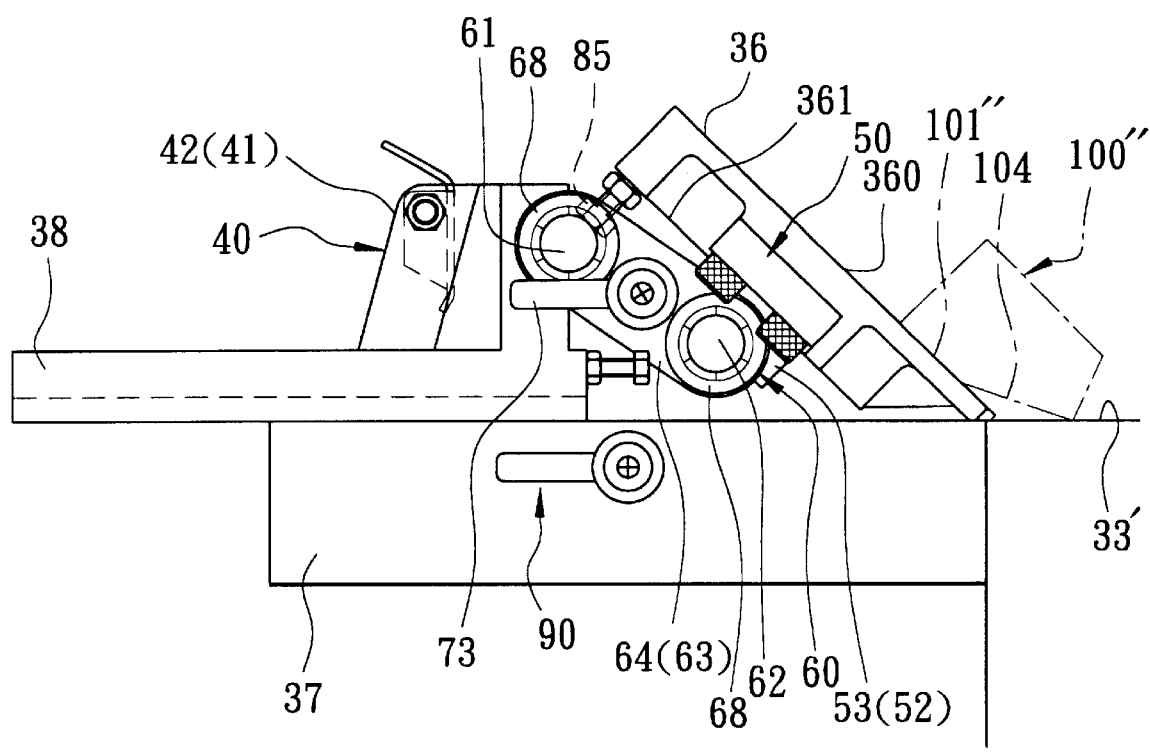
FIG. 12 is a schematic fragmentary side view of the preferred embodiment when the front surface of the plate is disposed at a rearwardly inclined position.

Referring to FIGS. 6 and 12, the plate 36 further has a threaded hole. The third supporting element 85 is shaped as a bolt that engages the threaded hole in the plate 36, that extends perpendicular to the front surface 360 of the plate 36, and that is capable of abutting against the fixed shaft 61 so as to form an obtuse angle between the front surface 360 of the plate 36 and the workpiece-supporting surface 33' of the bed. As such, a flat first surface 101" of a third workpiece 100" can be disposed to abut against the front surface 360 of the plate 36 so as to perform a finishing operation on a second surface 104 of the third workpiece 100", which forms an obtuse angle with respect to the first surface 101".

Figure 13:
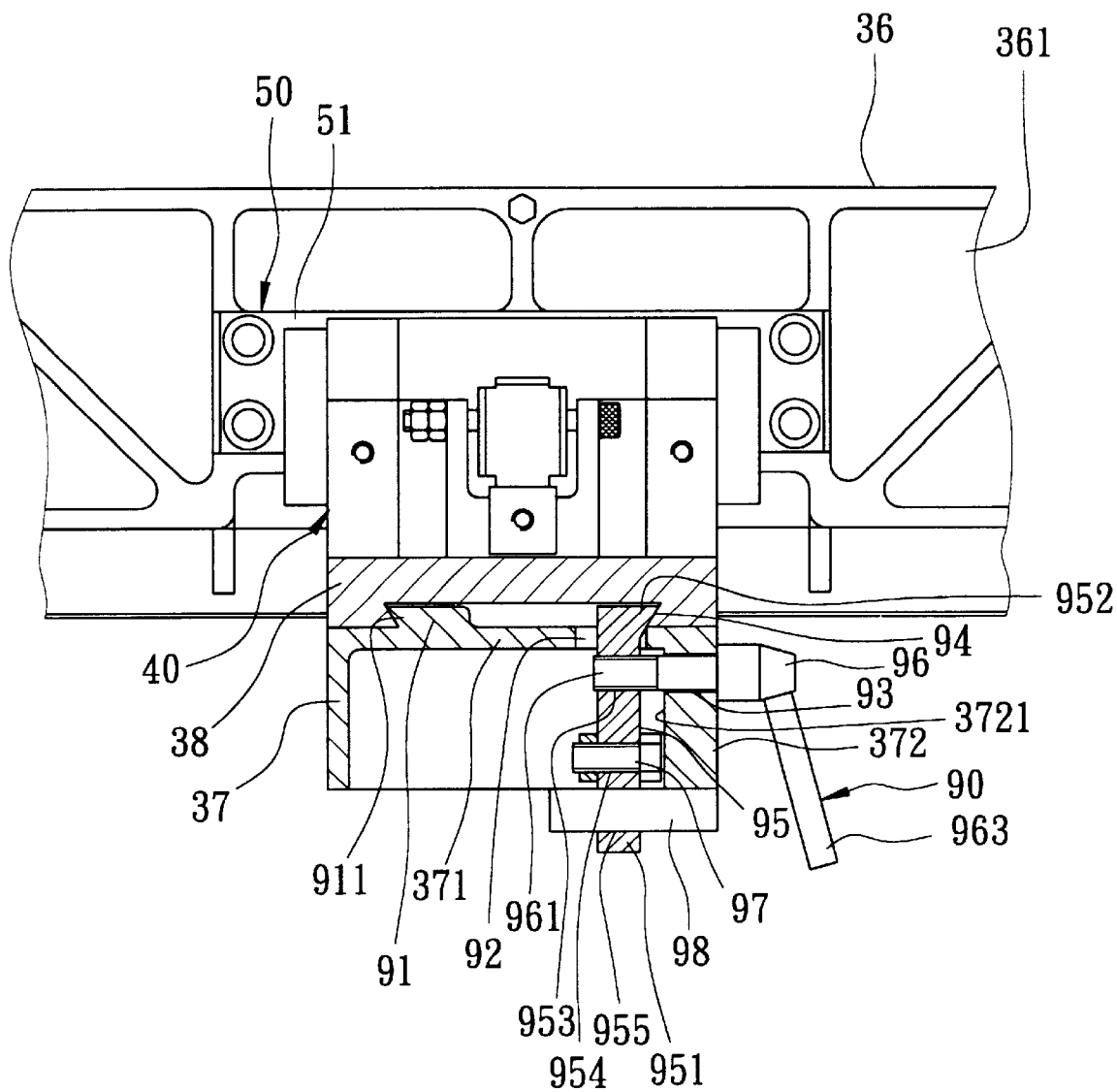
FIG. 13 is a fragmentary sectional view of the preferred embodiment, illustrating how a dovetail member is located at a locking position so as to lock the seat on a base.

Referring to FIGS. 6 and 13, the seat 38 is inverted U-shaped, and has a bottom surface 383, which is formed with a dovetail groove 94 that is defined among a horizontal top wall 384 and a pair of first and second side walls 385, 385' extending integrally and downwardly from two opposite sides of the top wall 384. The seat-locking unit 90 includes a fixed dovetail rib 91, which is fixed on the base 37, which is inserted into the dovetail groove 94 in the seat 38, and which has an sharp upper edge 911 that presses against an inner surface of the first side wall 385 of the seat 38. The seat 37 is hollow, and has a horizontal top wall 371 that is formed with a slot 92 therethrough, and a vertical wall 372 that extends integrally and downwardly from a side of the top wall 371 and that is formed with a hole 93. The seat-locking unit 90 further includes a dovetail member 95, a rotary rod assembly 96, a limiting bolt 97, and two parallel horizontal guide rods 98 that are connected fixedly to the base 37 and that extend in the workpiece-feeding direction. The dovetail member 95 is disposed movably within the slot 92 in the top wall 371 of the base 37, and has an integral vertical plate portion 951, a sharp upper edge 952 that is disposed movably within the dovetail groove 94 in the seat 38, a large threaded hole 953 that is formed through the vertical plate portion 951, a small threaded hole 954 formed through the vertical plate portion 951 under the large threaded hole 953, and two guide holes 955 that are formed through the vertical plate portion 951 below the small threaded hole 954. The guide rods 98 of the base 37 extend respectively through the guide holes 955 in the dovetail member 95 so as to guide the dovetail member 95 to move relative to the base 37 in the workpiece-feeding direction.

Figure 14:
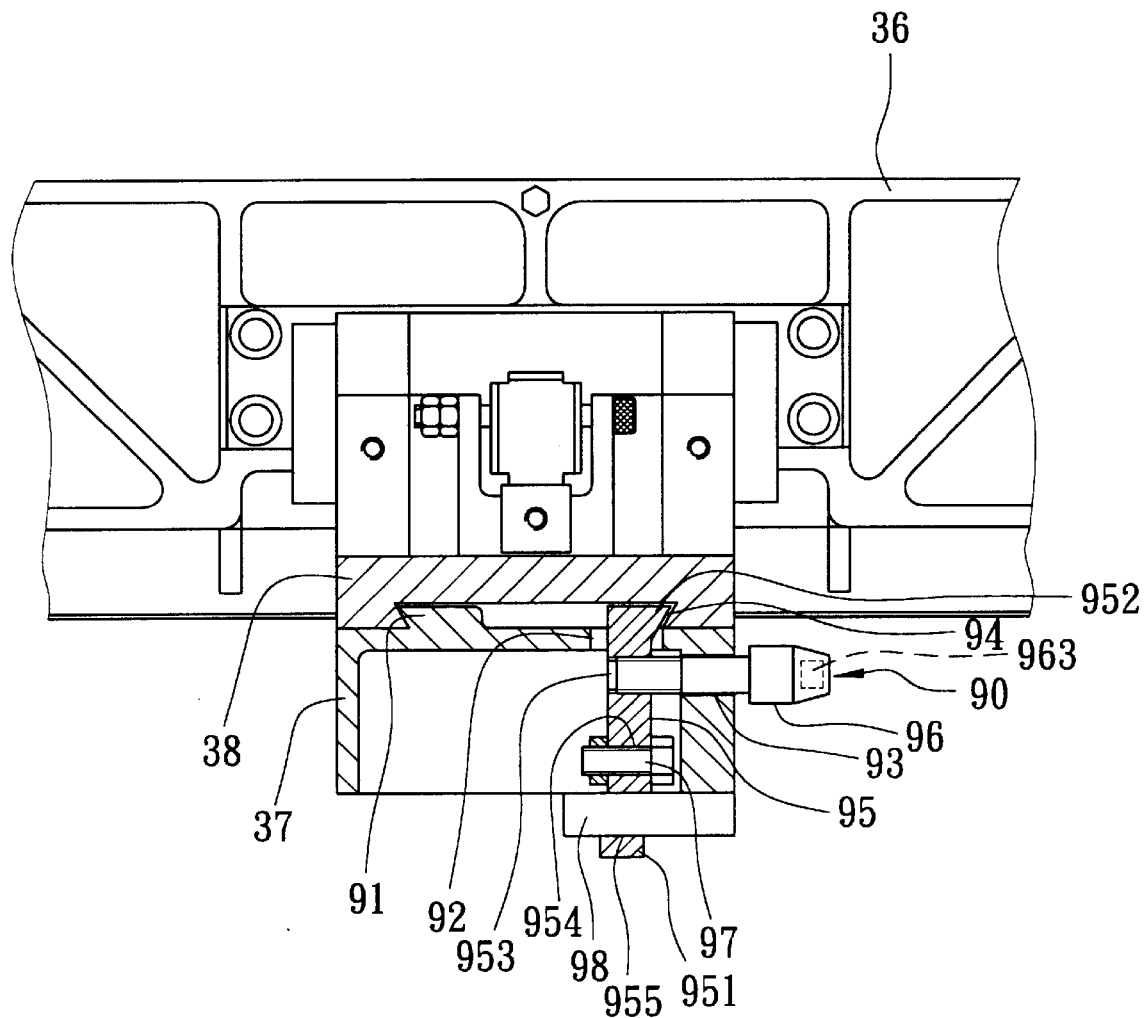
FIG. 14 is a fragmentary sectional view of the preferred embodiment, illustrating how the dovetail member is disposed at a release position so as to unlock the seat from the base.

The rotary rod assembly 96 includes a rod body 961, a radially and outwardly extending outward flange 962, and a rotary lever 963. The rod body 961 has a threaded first end 9611 that engages the large threaded hole 953 in the dovetail member 95, and a non-threaded second end 9612 that extends through the hole 93 in the vertical wall 372 of the base 37. The outward flange 962 extends integrally, radially and outwardly from the second end 9612 of the rod body 961. The rotary lever 963 is formed integrally with the outward flange 962, and is rotatable to move the dovetail member 95 on the rotary rod assembly 96 in the workpiece-feeding direction between a locking position shown in FIG. 13, where the sharp upper edge 952 of the dovetail member 95 presses against an inner surface of the second side wall 385' of the seat 38 so as to lock the seat 38 on the base 21, and an release position shown in FIG. 14, where the sharp upper edge 952 of the dovetail member 95 is removed from the inner surface of the second side wall 385' so as to unlock the seat 38 from the base 37. The limiting bolt 97 engages the small threaded hole 954 in the vertical plate portion 951 of the dovetail member 95, and has an end that is adjacent to an inner surface 3721 of the vertical wall 372 of the base 37 so as to prevent swaying of the dovetail member 95 about the rotary rod assembly 96 when the dovetail member 95 moves on the rotary rod assembly 96.

Referring to FIG. 6, the wood planing machine of this invention has the following advantages:

(1) The plate 36 is supported rotatably on the seat 38 by means of the first and second links 63, 64. Because the first and second links 63, 64 are connected pivotally to the first and second fixing blocks 41, 42 that are disposed on the two sides of the seat 38, the plate 36 can be fixed effectively relative to the seat 38. Furthermore, the plate 36 can be prevented by the first and second links 41, 42 from sway about the seat 38 during operation.

(2) There is no need for a high manufacturing precision of the first and second links 63, 64, the fixing blocks 41, 42, and the first and second coupling blocks 52, 53.

(3) The first, second, and third supporting elements 82, 84, 85 facilitate fixing of the plate 36 on the machine bed.

(4) The seat 38 can locked firmly on the base 37 by engagement between the dovetail groove 94 in the seat 38 and the dovetail rib 91 of the base 37 and the movable dovetail member 95. Because the rib 91 and the dovetail member 95 are disposed within the two sides of the dovetail groove 94 in the seat 38, the seat 38 can move smoothly on the base 37.

With this invention thus explained, it is apparent that numerous modifications and variations can be made without departing from the scope and spirit of this invention. It is therefore intended that this invention be limited only as indicated by the appended claims.

I claim:

1. A wood planing machine for cutting a workpiece, the workpiece having a flat surface, said wood planing machine comprising:

a machine bed having a workpiece-supporting surface that is adapted to support the workpiece;

an elongated cutter journalled on and projecting upward from said workpiece-supporting surface of said bed;

a workpiece-guiding plate disposed on said bed behind said workpiece-supporting surface of said bed and having a rear side and a flat front surface that is disposed adjacent to said cutter and that is adapted to permit abutment and sliding movement of the flat surface of the workpiece thereon when pushing the workpiece in a workpiece-feeding direction for cutting the workpiece;

a fixed base disposed fixedly on said bed and located behind said plate;

a movable seat disposed movably on said base and movable on said base in a seat-moving direction transverse to said workpiece-feeding direction;

a pair of first and second fixing blocks disposed respectively and fixedly on two opposite sides of said seat, each of said first and second fixing blocks having a flat outer side surface;

a pair of first and second coupling blocks mounted fixedly on said rear side of said plate and aligned respectively with said first and second fixing blocks along said seat-moving direction, each of said first and second coupling blocks having a flat outer side surface;

a driving unit including
  a fixed shaft having a pair of first and second end portions that are connected respectively and fixedly to said first and second fixing blocks,
  a rotatable shaft having a pair of first and second end portions that are connected respectively and fixedly to said first and second coupling blocks,
  a first link having two ends that are sleeved respectively and rotatably on said first end portions of said fixed shaft and said rotatable shaft, a hole that is formed through said first link and that is disposed between said two ends of said first link, and a flat inner side surface that presses against said outer side surfaces of said first fixing block and said first coupling block, and a second link having two ends that are sleeved respectively and rotatably on said second end portions of said fixed shaft and said rotatable shaft, a hole that is formed through said second link and that is disposed between said two ends of said second link, and a flat inner side surface that presses against said outer side surfaces of said second fixing block and said second coupling block so as to clamp said first and second fixing blocks and said first and second coupling blocks between said first and second links, thereby locking said plate relative to said movable seat; and a control rod assembly extending through said holes in said first and second links and rotatable in a first direction to move said first and second links away from each other so as to release said first and second fixing blocks and said first and second coupling blocks from said first and second links, thereby permitting rotation of said rotatable shaft and said plate about said fixed shaft so as to adjust angle of said front surface of said plate with respect to said bed, said control rod assembly being rotatable in an opposite second direction when angle adjustment of said plate is completed, so as to move said first and second links toward each other, thereby clamping said first and second fixing blocks and said first and second coupling blocks between said first and second links.

2. The wood planing machine as claimed in claim 1, wherein said control rod assembly includes:

a rod body having a threaded first end and a non-threaded second end;

an outward flange extending integrally, radially and outwardly from said second end of said rod body so as to clamp said second link between said outward flange and said second fixing block and between said outward flange and said second coupling block; and a radially and outwardly extending rotary lever formed integrally with said outward flange;

said hole in said first link being threaded to engage threadably said first end of said rod body so as to move said first link away from said outward flange when said rotary lever rotates in the first direction and so as to move said first link toward said outward flange when said rotary lever rotates in the opposite second direction.

3. The wood planing machine as claimed in claim 1, wherein each of said first and second fixing blocks has a front surface that is formed with a generally triangular-cross-sectioned groove, said fixed shaft having a circular cross-section and being bolted into said grooves in said first and second fixing blocks.

4. The wood planing machine as claimed in claim 1, wherein each of said first and second coupling blocks has a rear surface that is formed with a generally triangular-cross-sectioned groove, said rotatable shaft having a circular cross-section and being bolted into said grooves in said first and second coupling blocks.

5. The wood planing machine as claimed in claim 1, wherein said base has a horizontal top surface, said first and second fixing blocks being fixed on said top surface and having two vertical guide surfaces that define a guideway therebetween on said top surface, said plate having a first engagement surface at a lower end portion thereof that is parallel to said front surface of said plate, said machine further comprising a plate-supporting unit, which includes:

a positioning rod received slidably within said guideway between said first and second fixing blocks in such a manner that two opposite sides of said positioning rod abut respectively against said guide surfaces of said first and second fixing blocks, said positioning rod including a front end, a rear end, a top surface that is formed with a positioning groove defined by a front side wall, and a central hole that is formed axially through said positioning rod and that has a threaded rear end;

a first supporting element shaped as a horizontal rod and extending through said central hole in said positioning rod, said first supporting element having an non-threaded front end that projects forward from said front end of said positioning rod and that is capable of abutting against said first engagement surface of said plate so as to locate said front surface of said plate at a vertical position, and a threaded rear end that engages threadably said threaded rear end of said central hole in said positioning rod and that projects rearward from said rear end of said positioning rod;

a retaining crank mounted pivotally between said first and second fixing blocks and having an upper crank arm, and a lower crank arm that is disposed rotatably within said positioning groove in said top surface of said positioning rod and that abuts against said front side wall of said positioning rod so as to prevent rearward movement of said positioning rod on said seat, thereby positioning said first supporting element relative to said seat, said positioning rod being capable of being pushed forward on said seat so as to turn said lower crank arm rearward within said positioning groove such that said upper crank arm can be rotated relative to said seat to remove said lower crank arm from said positioning groove, thereby permitting position adjustment of said first supporting element relative to said seat; and a nut engaging said threaded rear end of said first supporting element and abutting against said rear end of said positioning rod, thereby locking said first supporting element on said positioning rod.

6. The wood planing machine as claimed in claim 5, wherein said seat has a vertical front surface that is formed with a threaded hole, said lower end portion of said plate further having a second engagement surface that forms an obtuse angle with respect to said first engagement surface, said plate-supporting unit further including a second supporting element that is shaped as a headed bolt and that engages said threaded hole in said seat, said bolt having a front end head portion that is capable of abutting against said second engagement surface of said plate so as to form an acute angle between said front surface of said plate and said workpiece-supporting surface of said bed.

7. The wood planing machine as claimed in claim 6, wherein said plate further has a threaded hole, said plate-supporting unit further including a third supporting element, which is shaped as a bolt that engages said threaded hole in said plate, that extends in a direction perpendicular to said front surface of said plate, and that is capable of abutting against said fixed shaft so as to form an obtuse angle between said front surface of said plate and said workpiece-supporting surface of said bed.

8. The wood planing machine as claimed in claim 1, wherein said seat is inverted U-shaped, and has a horizontal top wall and a pair of first and second side walls that extend integrally from two opposite sides of said top wall of said seat, each of said first and second side walls having an inner surface, said machine further comprising a seat-locking unit, which includes:

a dovetail groove formed among said top wall and said first and second side walls of said seat and extending along said seat-moving direction;

a fixed dovetail rib fixed on said base and having a sharp upper edge that is inserted into said dovetail groove and that presses against said inner surface of said first side wall of said seat;

a movable dovetail member disposed movably on said base and having a sharp upper edge that is inserted into said dovetail groove, said dovetail member being movable in said workpiece-feeding direction between a locking position, where said sharp upper edge of said dovetail member presses against said inner surface of said second side wall of said seat so as to lock said seat on said base, and an release position, where said sharp upper edge of said dovetail member is removed from said inner surface of said second side wall so as to unlock said seat from said base; and a rotary rod assembly disposed rotatably on said base and operable so as to move said dovetail member between said locking position and said release position.

9. The wood planing machine as claimed in claim 8, wherein said base is hollow, and has a horizontal top wall that is formed with a slot therethrough, a vertical wall that is formed with a hole therethrough, and two fixed horizontal guide rods, said dovetail member being disposed movably within said slot in said top wall of said base, and having an integral vertical plate portion that is formed with a threaded hole and two guide holes, said guide rods of said base extending respectively through said guide holes in said dovetail member so as to guide said dovetail member to move relative to said base in said workpiece-feeding direction, said rotary rod assembly including:

a rod body having a threaded first end that engages said threaded hole in said dovetail member, and a non-threaded second end;

an outward flange extending integrally, radially and outwardly from said second end of said rod body of said rotary rod assembly, said vertical wall of said base being clamped between said dovetail member and said outward flange of said rotary rod assembly when said rotary rod assembly is disposed at said locking position, thereby preventing movement of said dovetail member relative to said base; and a radially and outwardly extending rotary lever formed integrally with said outward flange of said rotary rod assembly, said rotary lever of said rotary rod assembly being rotatable to move said dovetail member on said rotary rod assembly between said locking position and said release position.

10. The wood planing machine as claimed in claim 9, wherein said seat-locking unit further includes a horizontal limiting bolt, which is connected threadedly to said vertical plate portion of said dovetail member, which is spaced apart from said rotary rod assembly, and which has an end that is adjacent to said vertical wall of said base so as to prevent swaying of said dovetail member about said rotary rod assembly when said dovetail member moves on said rotary rod assembly.

* * * * *